United States Patent
Sheik-Nainar et al.

(10) Patent No.: US 9,823,767 B2
(45) Date of Patent: *Nov. 21, 2017

(54) PRESS AND MOVE GESTURE

(71) Applicant: Synaptics Incorporated, San Jose, CA (US)

(72) Inventors: Mohamed Sheik-Nainar, San Jose, CA (US); Eric Faggin, San Jose, CA (US); Justin Mockler, San Jose, CA (US); Matt Camilleri, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/485,037

(22) Filed: Apr. 11, 2017

(65) Prior Publication Data

US 2017/0220173 A1    Aug. 3, 2017

Related U.S. Application Data

(63) Continuation of application No. 14/920,146, filed on Oct. 22, 2015, now Pat. No. 9,652,069.

(51) Int. Cl.
G06F 3/041       (2006.01)
G06F 3/044       (2006.01)
G06F 3/0354      (2013.01)
G06F 3/0488      (2013.01)

(52) U.S. Cl.
CPC ........ G06F 3/0414 (2013.01); G06F 3/03547 (2013.01); G06F 3/044 (2013.01); G06F 3/04883 (2013.01)

(58) Field of Classification Search
CPC .... G06F 3/0414; G06F 3/016; G06F 3/03547; G06F 3/0412; G06F 3/0416; G06F 3/0482; G06F 3/04842; G06F 3/04845; G06F 3/04883; G06F 3/044
See application file for complete search history.

(56) References Cited

U.S. PATENT DOCUMENTS

| | | |
|---|---|---|
| 6,034,672 A | 3/2000 | Gaultier et al. |
| 6,388,655 B1 | 5/2002 | Leung |
| 6,492,979 B1 | 12/2002 | Kent et al. |
| 6,765,559 B2 | 7/2004 | Hayakawa |
| 6,940,494 B2 | 9/2005 | Hoshino et al. |

(Continued)

*Primary Examiner* — Dmitriy Bolotin
(74) *Attorney, Agent, or Firm* — Osha Liang LLP

(57) ABSTRACT

A method. The method may include obtaining force information regarding an input force applied by an input object to a sensing region of an input device. The method may include determining, using the force information, that the input force exceeds a first force threshold. The method may include determining, using the force information, whether the input force exceeds a second force threshold. The method may include obtaining positional information for an input object in the sensing region of the input device. The method may include determining, using the positional information, that a change in position of the input object is less than a distance threshold when the input force exceeds the second force threshold. The method may include performing an interface action within a graphical user interface in response to determining that the input force decreases below at least the second force threshold.

20 Claims, 13 Drawing Sheets

(56) References Cited

U.S. PATENT DOCUMENTS

| | | |
|---|---|---|
| 7,683,889 B2 | 3/2010 | Rimas Ribikauskas et al. |
| 7,952,566 B2 | 5/2011 | Poupyrev et al. |
| 8,344,883 B2 | 1/2013 | Ujii et al. |
| 8,421,483 B2 | 4/2013 | Klinghult et al. |
| 8,570,297 B2 | 10/2013 | Bulea et al. |
| 8,633,911 B2 | 1/2014 | Schediwy et al. |
| 8,797,295 B2 | 8/2014 | Bernstein et al. |
| 2006/0279548 A1 | 12/2006 | Geaghan |
| 2006/0284858 A1 | 12/2006 | Rekimoto |
| 2008/0024454 A1 | 1/2008 | Everest |
| 2009/0046110 A1 | 2/2009 | Sadler et al. |
| 2009/0153340 A1 | 6/2009 | Pinder et al. |
| 2009/0160793 A1 | 6/2009 | Rekimoto |
| 2009/0201261 A1 | 8/2009 | Day |
| 2009/0237374 A1 | 9/2009 | Li et al. |
| 2010/0079404 A1 | 4/2010 | Degner et al. |
| 2010/0097332 A1 | 4/2010 | Arthur et al. |
| 2010/0110018 A1 | 5/2010 | Faubert et al. |
| 2010/0253645 A1 | 10/2010 | Bolender |
| 2010/0271326 A1 | 10/2010 | Hu et al. |
| 2010/0302153 A1 | 12/2010 | Jung et al. |
| 2011/0012760 A1 | 1/2011 | Klinghult |
| 2011/0050588 A1 | 3/2011 | Li et al. |
| 2011/0141052 A1 | 6/2011 | Bernstein et al. |
| 2011/0141053 A1 | 6/2011 | Bulea et al. |
| 2011/0205182 A1 | 8/2011 | Miyazawa et al. |
| 2011/0239155 A1 | 9/2011 | Christie |
| 2011/0278078 A1 | 11/2011 | Schediwy et al. |
| 2011/0285666 A1 | 11/2011 | Poupyrev et al. |
| 2011/0291951 A1 | 12/2011 | Tong |
| 2012/0038583 A1 | 2/2012 | Westhues et al. |
| 2012/0068760 A1 | 3/2012 | Caldwell et al. |
| 2013/0093715 A1 | 4/2013 | Marsden et al. |
| 2013/0155018 A1 | 6/2013 | Dagdeviren |
| 2014/0238152 A1 | 8/2014 | Kallassi et al. |
| 2014/0362016 A1 | 12/2014 | Matsuki |
| 2015/0097791 A1 | 4/2015 | Lisseman et al. |
| 2015/0268786 A1* | 9/2015 | Kitada ............... G06F 3/0414 345/173 |
| 2015/0365306 A1 | 12/2015 | Chaudhri et al. |
| 2016/0070404 A1 | 3/2016 | Kerr et al. |
| 2016/0195989 A1 | 7/2016 | Czelnik et al. |
| 2016/0291708 A1 | 10/2016 | Feng |

* cited by examiner

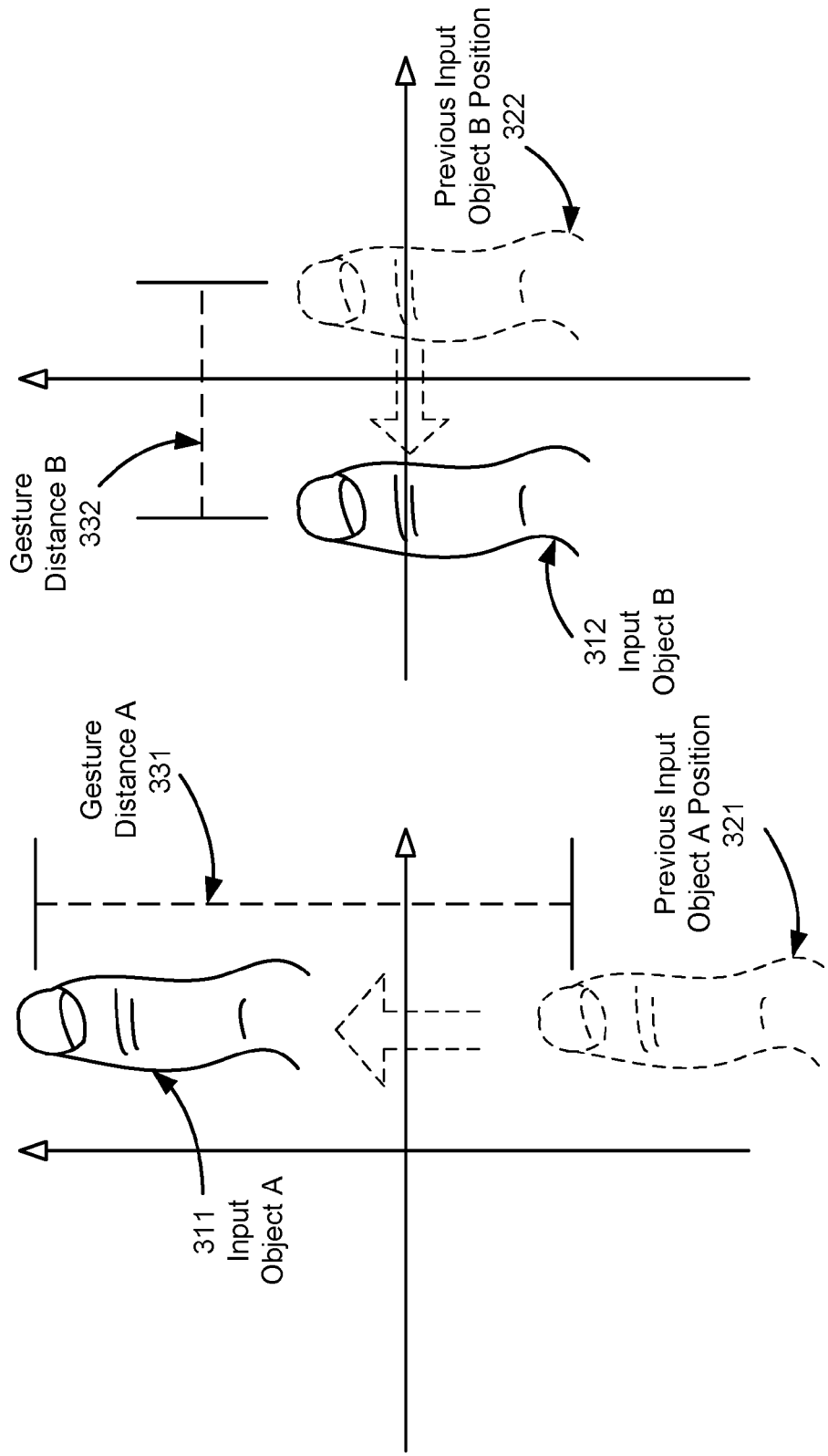

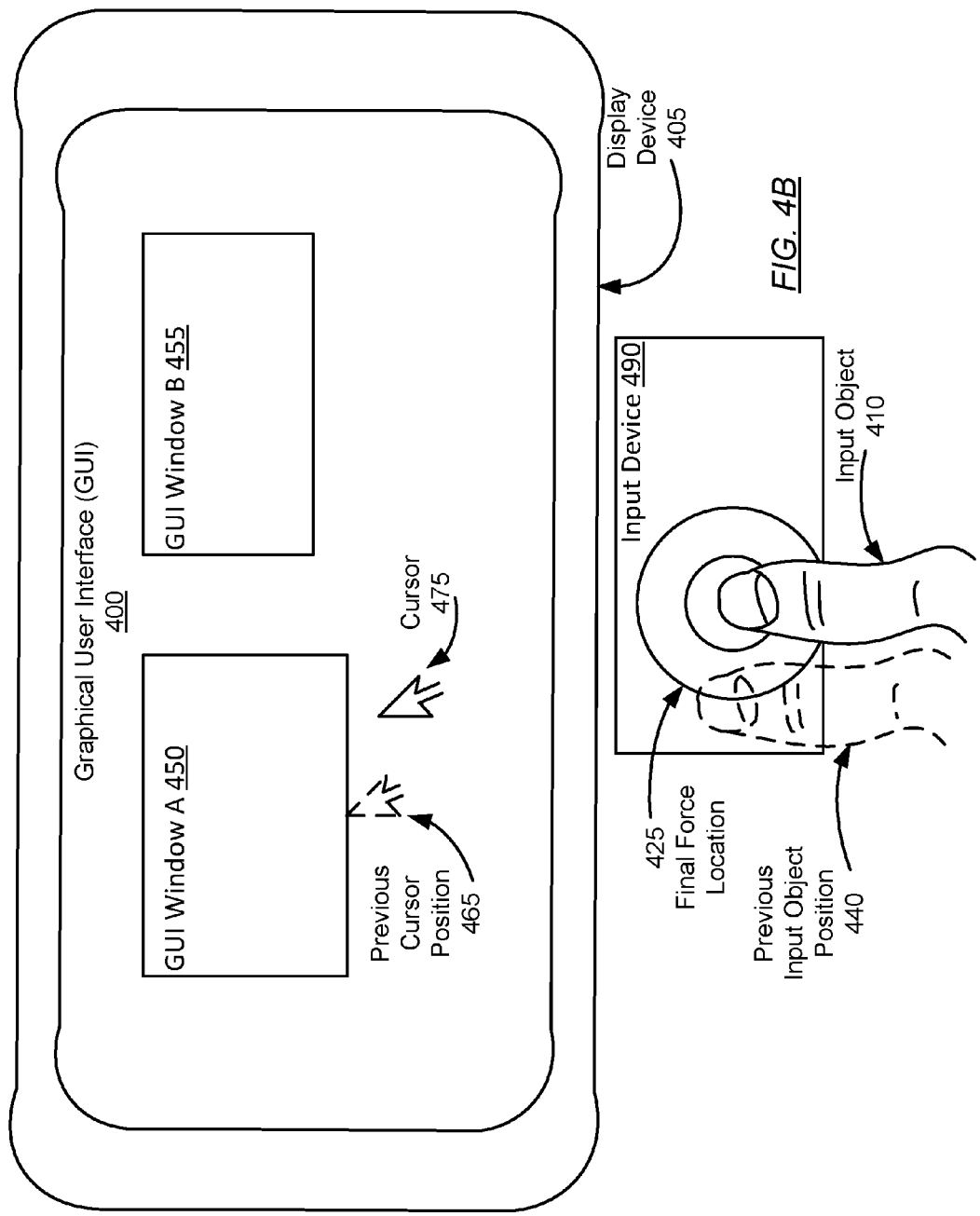

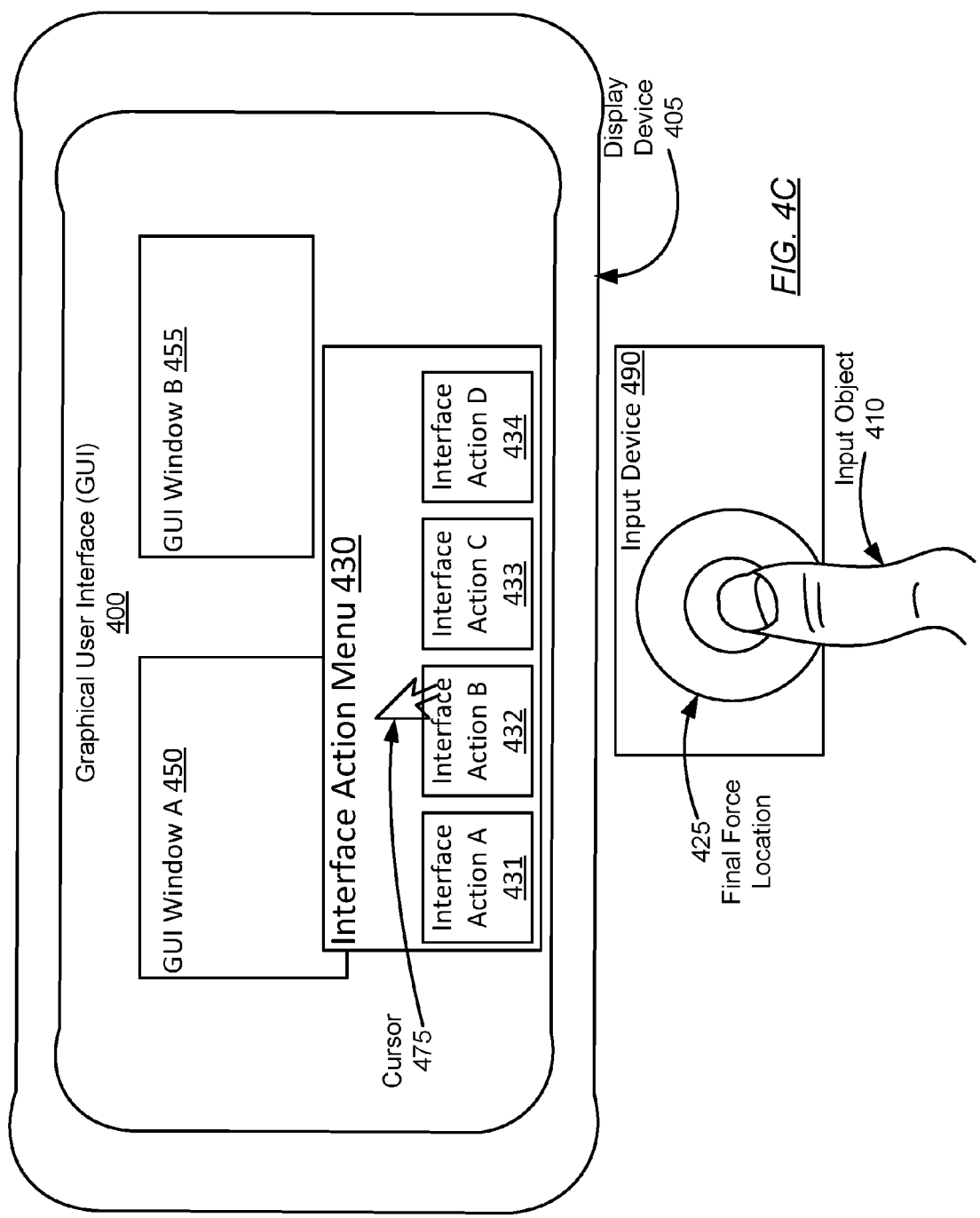

PRESS AND MOVE GESTURE

CROSS REFERENCE TO RELATED APPLICATIONS

This application is a continuation of and claims benefit under 35 U.S.C. §120 to U.S. application Ser. No. 14/920,146, filed Oct. 22, 2015, which is incorporated herein by reference in its entirety.

FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, the invention relates to a method. The method includes obtaining force information regarding an input force applied by at least one input object to a sensing region of an input device. The method further includes determining, using the force information, that the input force exceeds a first force threshold. The first force threshold corresponds to a first amount of force. The method further includes determining, using the force information, whether the input force exceeds a second force threshold. The second force threshold corresponds to a second amount of force that is greater than the first amount of force. The method further includes obtaining positional information for the at least one input object in the sensing region of the input device. The method further includes determining, using the positional information, that a change in position of the at least one input object is less than a distance threshold when the input force exceeds the second force threshold. The method further includes performing an interface action within a graphical user interface in response to determining that the input force decreases below at least the second force threshold.

In general, in one aspect, the invention relates to a processing system for an input device. The input device is configured to sense positional information and force information for input objects in a sensing region of the input device. The processing system includes sensor circuitry communicatively coupled to a various sensor electrodes of the input device. The processing system is configured to determine force information regarding an input force applied by at least one input object to an input surface. The processing system is further configured to determine, using the force information, that the input force exceeds a first force threshold. The first force threshold corresponds to a first amount of force. The processing system is further configured to determine, using the force information, whether the input force exceeds a second force threshold. The second force threshold corresponds to a second amount of force that is greater than the first amount of force. The processing system is further configured to determine, using the positional information, that a change in position of the at least one input object is less than a distance threshold when the input force exceeds the second force threshold. The processing system is further configured to perform an interface action within a graphical user interface in response to determining that the input force decreases below at least the second force threshold.

In general, in one aspect, the invention relates to an electronic system. The electronic system includes a display device configured to display a graphical user interface. The electronic system further includes an input device that includes various sensor electrodes and an input surface having a sensing region. The electronic system further includes a processing system communicatively coupled to the display device and the input device. The processing system is configured to determine force information regarding an input force applied by at least one input object to an input surface. The processing system is further configured to determine, using the force information, that the input force exceeds a first force threshold. The first force threshold corresponds to a first amount of force. The processing system is further configured to determine, using the force information, whether the input force exceeds a second force threshold. The second force threshold corresponds to a second amount of force that is greater than the first amount of force. The processing system is further configured to determine, using the positional information, that a change in position of the at least one input object is less than a distance threshold when the input force exceeds the second force threshold. The processing system is further configured to perform an interface action within a graphical user interface in response to determining that the input force decreases below at least the second force threshold.

Other aspects of the invention will be apparent from the following description and the appended claims.

BRIEF DESCRIPTION OF DRAWINGS

FIGS. 3A and 3B show schematic diagrams in accordance with one or more embodiments.

FIGS. 4A, 4B, and 4C show schematic diagrams in accordance with one or more embodiments.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments provide input devices and methods that facilitate improved usability. In particular, one or more embodiments are directed to a method that performs an interface action within a graphical user interface in response to an application of a high input force to an input device along with a corresponding gesture motion. In one or more embodiments, for example, the high input force may be detected using multiple force thresholds provided by an input device. Furthermore, the type of gesture motion associated with the high input force may determine the type of interface action, accordingly. If the gesture motion includes a small change in position of an input object, e.g. at a distance less than a specific distance threshold, then one type of interface action may performed. On the other hand, the interface action may also be selected based on whether the gesture motion occurs before or after a high input force is released from an input surface of the input device.

Figure 1:
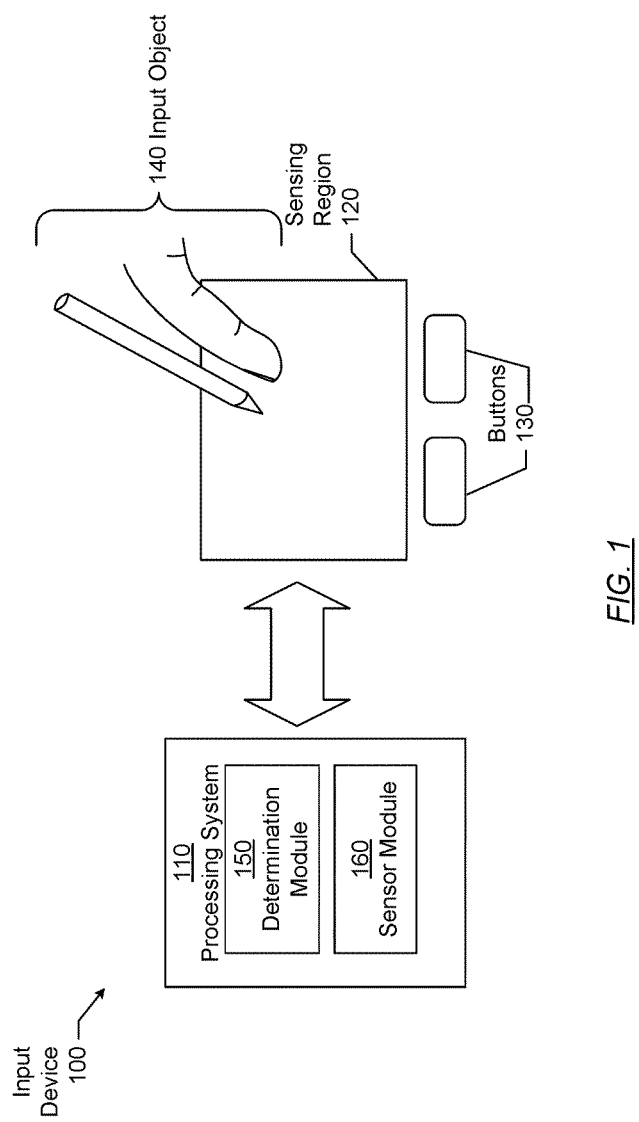
FIG. 1 shows a block diagram in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals (also called "sensing signal"). Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, determine force information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2A:
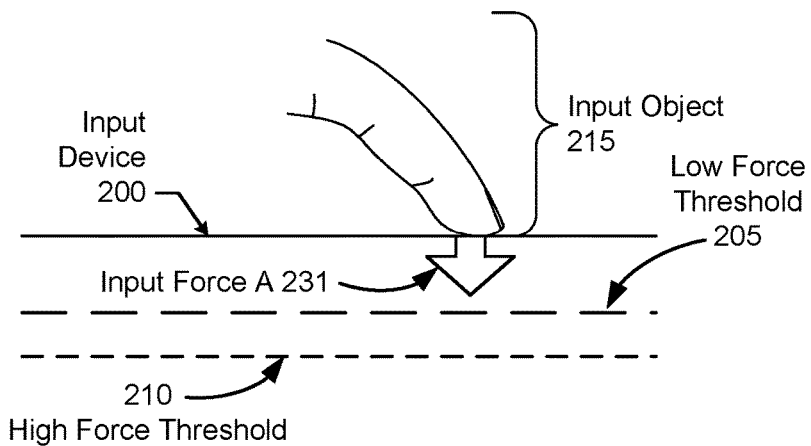
FIGS. 2A, 2B, and 2C show cross-sectional diagrams in accordance with one or more embodiments.
Figure 2B:
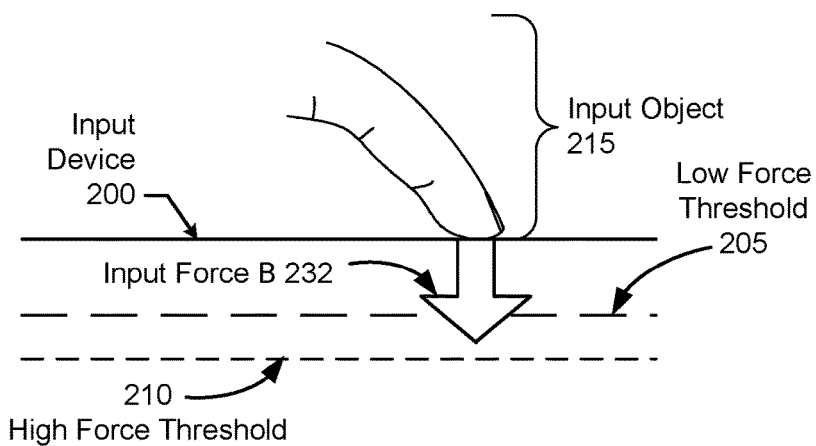
Figure 2C:
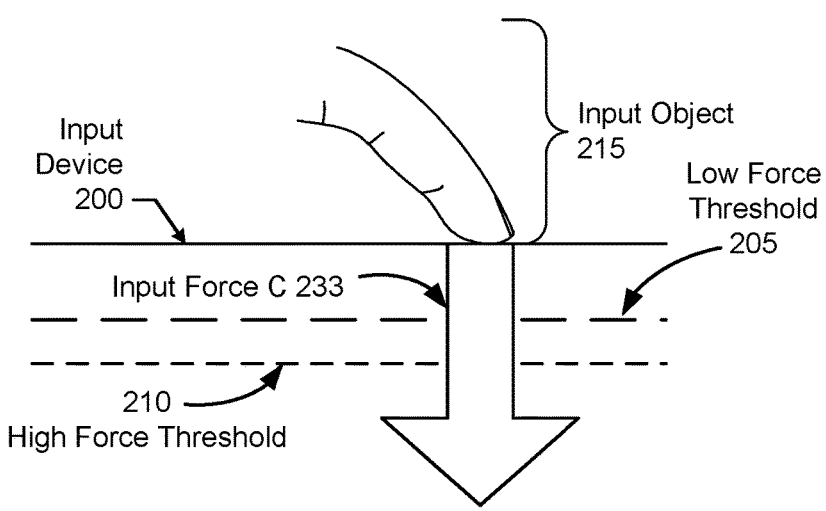

Turning to FIGS. 2A-2C, FIGS. 2A-2C show cross-sectional diagrams in accordance with one or more embodiments. As shown in FIGS. 2A-2C, an input object (215) may apply various input forces (e.g., input force A (231), input force B (232), and input force C (233)) to an input device (200). In particular, an input force may include an amount of force exerted by the input object (215) to an input surface of the input device (200). Thus, the input force may span various locations in a sensing region of the input device (200), and may also include one or more different force magnitudes at different locations of the input surface.

In one or more embodiments, the input device (200) includes a low force threshold (205) and a high force threshold (210). As such, the force thresholds (205, 210) may correspond to different values of force information, which may categorize different intensities for different input forces. In one or more embodiments, a force threshold corresponds to a specific amount of force (e.g., a specific magnitude of force and/or pressure). In one or more embodiments, a force threshold corresponds to a range of different force magnitudes. For example, the low force threshold (205) and the high force threshold (210) may be designated in a lookup table accessed by a processing system. While force thresholds may be defined using various amounts of force, in one or more embodiments, a force threshold is defined using the duration of time that an input force is applied above a specific force value. In one or more embodiments, a force threshold is defined by an amount of area on an input surface that obtains an input force above a specific force value.

Furthermore, as shown in FIG. 2A, the input force A (231) has a force magnitude that is below both the low force threshold (205) and the high force threshold (210). In comparison, as shown in FIG. 2B, the input force B (232) has a force magnitude that exceeds the low force threshold (205), but fails to surpass the high force threshold (210). As shown in FIG. 2C, the input force C (233) may surpass both the low force threshold (205) and the high force threshold (210). While two force thresholds are shown in FIGS. 2A-2C, other embodiments are contemplated where three or more force thresholds are implemented using an input device and/or processing system. Furthermore, categorizing an input force as a low force or a high force (also called a "press hard") by whether a respective force exceeds a high force threshold should not be intended as an actual description of the force magnitude of the respective force. The terminology between low forces and high forces is merely used to distinguish that one force threshold corresponds to a greater force value than the force value corresponding to a different force threshold.

Turning to FIGS. 3A-3B, FIGS. 3A-3B illustrate gesture motions in accordance with one or more embodiments. With respect to FIG. 3A, an input object A (311) may make a gesture motion along a vertical axis from a previous input object A position (321) to the final position of the input object A (311). In contrast, as shown in FIG. 3B, an input object B (312) may make a gesture motion along a horizontal axis from a previous input object B position (322) to the final position of input object B (312). Thus, FIGS. 3A-3B illustrate various gesture distances (i.e., gesture distance A (331), gesture distance B (332)) that may describe the length of movement as well as the direction of movement that the input objects (311, 312) travel across a sensing region.

Figure 4A:
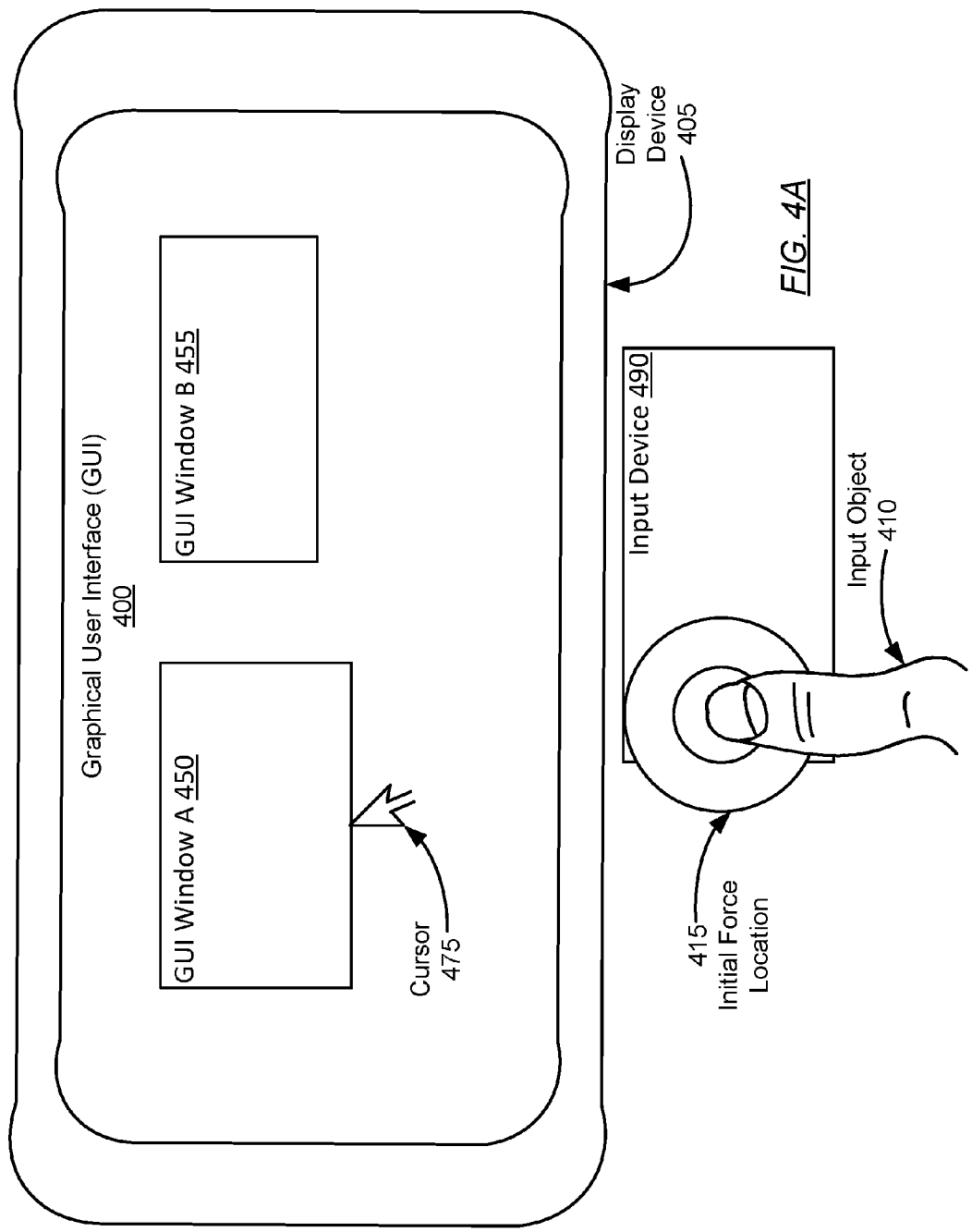

Turning to FIGS. 4A-4C, FIGS. 4A-4C show a system in accordance with one or more embodiments. As shown in FIG. 4A, a graphical user interface (GUI) (400) may operate on a display device (405). Specifically, the graphical user interface (400) may be a combination of software and/or hardware that provides various graphical components (e.g., GUI window A (450), GUI Window B (455), and a cursor (475)) for both displaying information to a user and/or obtaining user inputs from the user. In particular, the display device (405) may be a screen on a portable computing device, e.g., a laptop, tablet, etc, where the input device (490) may be an indirect interaction device that is separate from the display device (405), and thus, the input surface of the input device (490) does not overlap the screen of the display device (405). On the other hand, the graphical user interface (400) may also be located in a direct interaction device where the input surface of an input device overlaps a screen of the display device. For example, a direct interaction device may be a handheld computer device, such as a smartphone.

Keeping with FIGS. 4A-4C, the input object (410) may apply an input force in connection with a gesture motion from an initial force location (415) in FIG. 4A to a final force location (425) in FIGS. 4B-4C. In particular, the gesture motion may include the input object (410) changing position from the previous input object position (440) to the final input object position as shown in FIG. 4B. In one or more embodiments, the gesture motion includes an input force that exceeds a high force threshold, and where the chance in position occurs irrespective of whether the movement happens before or after release of the input force below the high force threshold (e.g., after the input object (410) exerts sufficient force to pass a predetermined force threshold, the input object (410) relaxes the force below the predetermined force threshold and proceeds to roll along the input device (490)). In one or more embodiments, the gesture motion includes a change in position from the previous input object position (440) to the final input object position while the input force remains above the high force threshold.

Turning to FIG. 4C, the graphical user interface (400) may obtain various commands and/or signals from an input device (490), which may be transformed into various interface actions. Specifically, a processing system (not shown) coupled to input object (410) may the commands and/or signals, which may subsequently trigger various interface actions. In one or more embodiments, interface actions are activities that produce a change in the graphical components of the graphical user interface (400) and/or a modification to a data source presented using graphical components within the graphical user interface (400). For example, an interface action may correspond to functionality performed with a cursor (475), such as moving a cursor (475) from a previous cursor position (465).

In one or more embodiments, the interface actions are generated in response to detecting different types of input forces and/or different gesture motions produced by the input object (410). In particular, this interaction between input forces and gesture motions may provide higher level context sensitive actions for the graphical user interface (400). Thus, an advantage of the interaction may implement various frequently used tasks to be performed based on the position of the input object (410) and/or cursor (475). For example, performing an interface action in response to moving a short distance by the input object (410) may reduce an amount of cursor movement by the user to perform the same interface action with the input force and gesture motion combination. As such, interface actions may be readily performed without having to navigate the cursor (475) to another location on the graphical user interface (400). Furthermore, using a slight gesture motion (e.g., determined using a distance threshold as described in FIG. 7 and the accompanying description) after applying a high input force may provide an optimal method for selecting a particular interface action. Accordingly, the gesture motion may be small enough to distinguish an intended gesture motion by a user from an unintended position change of the input object (410) during the application of an input force.

In one or more embodiments, interface actions include a content manipulation action by a user with respect to content provided by the graphical user interface (400). Content may include text as well as pictures, data objects, and various types of data files that are used by a computing device. In one or more embodiments, for example, a content manipulation action includes copying, moving, dragging, and cutting the content from one location within the graphical user interface (400). On the other hand, another content manipulation action may include pasting the content to a different location within the graphical user interface (400). In one or more embodiments, content manipulation actions may include undoing an edit or redoing the edit to content provided by the graphical user interface (400).

In one or more embodiments, the interface action include a window manipulation action with respect to the GUI windows (450, 455) disposed in the graphical user interface (400). For example, a window manipulation action may maximize or minimize the GUI window A (450) within the graphical user interface (400). In another example, a window manipulation action may align the GUI window A (450) to a left-side (i.e, a "snap left" action) or the GUI window B (455) to the right-side (i.e, a "snap right" action) on the screen of the display device (405).

In one or more embodiments, an interface action generates an interface action menu (430) that is displayed in the graphical user interface (400). The interface action menu (430) may list various interface actions (e.g., interface action A (431), interface action B (432), interface action C (433), interface action D (434)) using graphical icons presented inside the interface action menu (430). Thus, the interface action menu (430) may provide assistance to novice users in using the graphical user interface (400). In one or more embodiments, the interface action menu is based on user activity performed with the graphical user interface (400) prior to passing a high force threshold.

Figure 5:
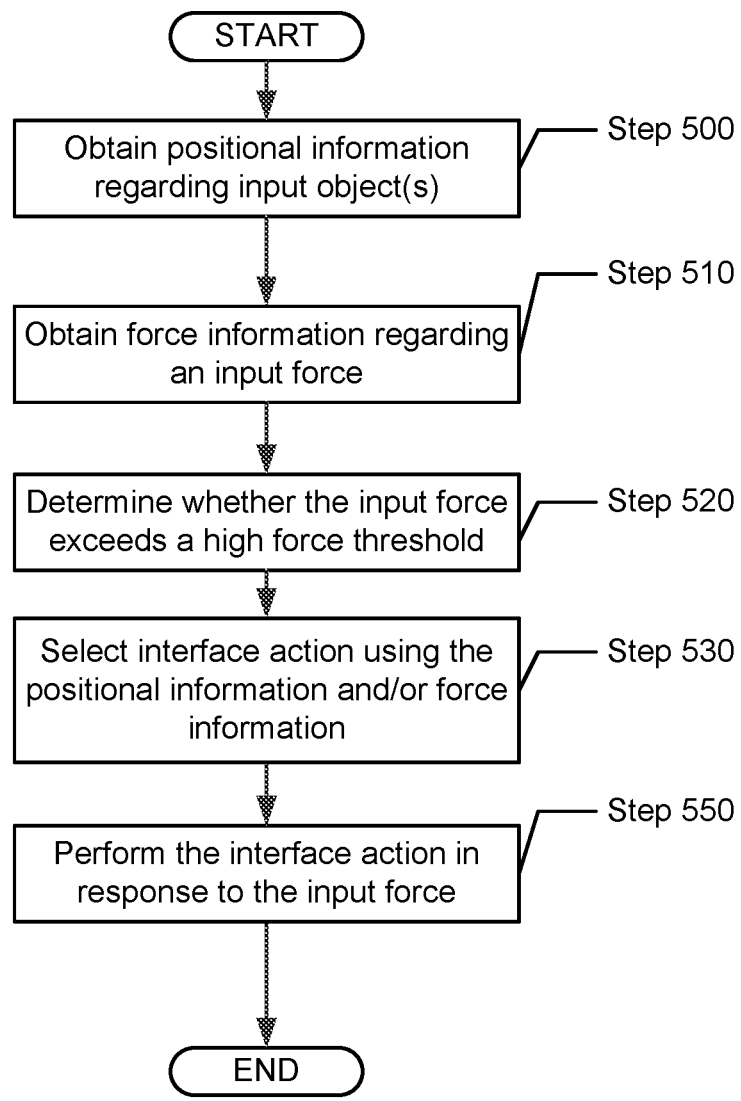
FIGS. 5, 6, and 7 show flowcharts in accordance with one or more embodiments.

Turning to FIG. 5, FIG. 5 shows a flowchart in accordance with one or more embodiments. The process shown in FIG. 5 may involve, for example, one or more components discussed above in reference to FIG. 1 (e.g., processing system (110)). While the various steps in FIG. 5 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 500, positional information is obtained regarding input object(s) in accordance with one or more embodiments. Specifically, positional information may be obtained from various sensor electrodes as described in FIG. 1 and the accompanying description. For example, the positional information may be obtained using an input device to detect the position of an input object in a sensing region. Thus, the positional information may describe one or more positions of the input object within a sensing region, such as an initial position of the input object at one point in time and a final position of the input object at a later point in time.

In Step 510, force information is obtained regarding an input force in accordance with one or more embodiments. Specifically, the force information regarding the input force may be obtained from various sensor electrodes as described in FIG. 1 and the accompanying description.

In Step 520, a determination is made whether an input force exceeds a high force threshold in accordance with one or more embodiments. Specifically, in response to an application of an input force by an input object to an input device, a processing system may determine whether the input force exceeds the high force threshold using the force information from Step 510. In one or more embodiments, for example, a force threshold is defined by the processing system according to whether one or more force values associated with the input force are at or above a specified limit Thus, the processing system may compare the force information from an input force to the force values designated by a particular force threshold to determine whether the input force exceeds the high force threshold. In one or more embodiments, an input device includes two or more force thresholds.

In Step 530, an interface action is selected using positional information and/or force information in accordance with one or more embodiments. In one or more embodiments, the interface action is selected according to the context of an input force and a gesture movement by the input object associated with the input force. For example, a gesture motion may occur after an input force exceeds a high force threshold. Depending on the type of input force and the type of gesture motion, various force-and-gesture combinations may be produced that correspond to different types of interface actions.

In one or more embodiments, the interface action may be selected by a processing system coupled to an input device. On the other hand, in one or more embodiments, a graphical user interface selects the interface action using a signal or message from an input device that describes the input force and/or gesture motion described by the positional information and/or force information.

In Step 550, an interface action is performed in response to an input force in accordance with one or more embodiments.

Figure 6:
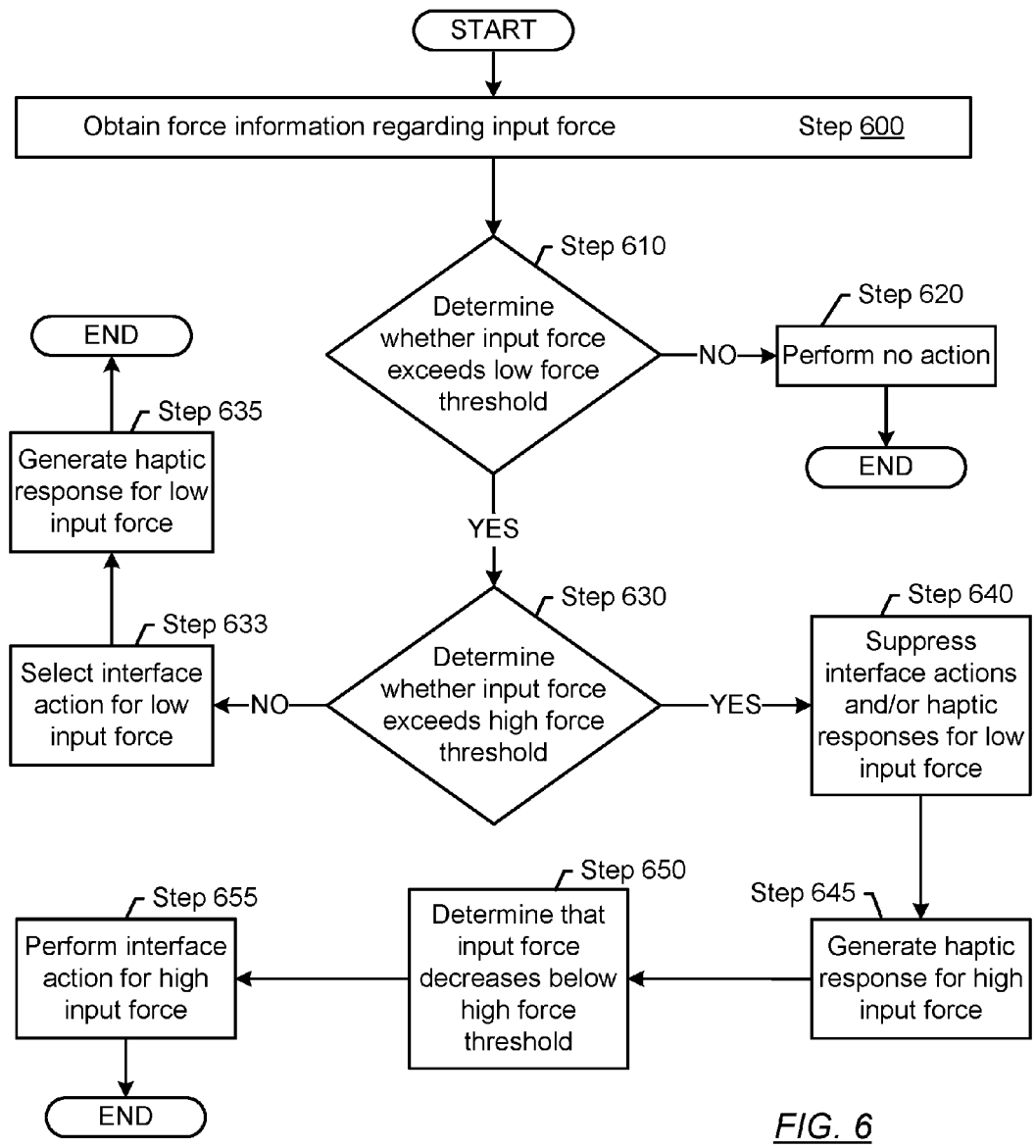

Turning to FIG. 6, FIG. 6 illustrates a flowchart in accordance with one or more embodiments. The process shown in FIG. 6 may involve, for example, one or more components discussed above in reference to FIG. 1 (e.g., processing system (110)). While the various steps in FIG. 6 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 600, force information is obtained regarding an input force in accordance with one or more embodiments. In particular, force information may be obtained from an input device having various sensor electrodes. For example, the sensor electrodes may detect changes in capacitance resulting from input forces applied to an input surface of an input device, e.g., by an input object. For more information on sensor electrodes, see FIG. 1 and the accompanying description.

In Step 610, a determination is made whether an input force is above a low force threshold in accordance with one or more embodiments. In one or more embodiments, a processing system coupled to an input device may compare the force information obtained from Step 600 to one or more designated force threshold values, e.g., in a lookup table. Thus, if the low force threshold has a force cutoff value and the force information regarding the input force surpasses it, then the processing system may determine that the low force threshold is exceeded. If the force information does not surpass the force cutoff value, then the processing system may determine that the input force failed to exceed the low force threshold.

When it is determined that the input force fails to exceed the low force threshold, the process may proceed to Step 620. When it is determined that the input force exceeds the low force threshold, the process may proceed to Step 630.

In Step 620, no action is performed in accordance with one or more embodiments. Specifically, if the force information from Step 600 does not describe an input force that passes any force threshold, a processing system may determine that no interface action is to be performed. On the other hand, a processing system may perform a default interface action and/or an interface action based only on positional information.

In Step 630, a determination is made whether an input force is above a high force threshold in accordance with one or more embodiments. In one or more embodiments, using the force information from Step 500, a processing system determines whether the input force exceeds a high force threshold. In one or more embodiments, for example, the processing system ignores the determination in Step 610 and only makes a determination in Step 630. In one or more embodiments, where an input device includes three or more force thresholds, one of the force thresholds is designated as the high force threshold for various interface actions.

When it is determined that the input force fails to exceed the high force threshold, the process may proceed to Step 633. When it is determined that the input force exceeds the high force threshold, the process may proceed to Step 640.

In Step 633, an interface action is selected for a low input force in accordance with one or more embodiments. Using a determination that the force information from Step 600 corresponds to a low input force, one or more interface actions may be selected by a processing system. In one or more embodiments, the selection of the interface action for the low input force is also based on a gesture motion determined by FIG. 7 and the accompanying description below.

In Step 635, a haptic response is generated for a low input force in accordance with one or more embodiments. In one or more embodiments, for example, the haptic response is physical feedback generated for a user using an input device. For example, the haptic response may be a physical vibration and/or physical resistance experienced by a user of an input device. In one or more embodiments, the haptic response is configured to emulate a physical response produced using a tactile switch (also called "tact switch").

In Step 640, various interface actions and/or haptic responses are suppressed for a low input force in accordance with one or more embodiments. In one or more embodiments, upon determining that the input force passes a high force threshold in Step 630, a processing system determines whether to ignore various interface actions and/or haptic responses associated with passing a low force threshold but not passing the high force threshold. For example, ignoring the interface actions and/or haptic responses may involve designating that various processor instructions are not to be performed.

In one or more embodiments, a rate of change of an input force is determined from the force information in Step 600. If the rate of change is high, a haptic response for a low input force is ignored.

In Step 645, a haptic response is generated for a high input force in accordance with one or more embodiments. In particular, the haptic response generated in Step 645 is similar to the haptic response produced in Step 635. In one or more embodiments, the haptic response for the high input force has a greater intensity than the haptic response for the low input force. For example, if the haptic response corresponds to a physical resistance to an input object, the physical resistance produced by the input device may be greater for the high input force than a low input force. In one or more embodiments, a processing system selects the type of haptic response using the determinations in Step 610 and/or Step 630.

In Step 650, a determination is made that an input force decreases below at least a high force threshold in accordance with one or more embodiments. In one or more embodiments, the force information from Step 500 describes an input force at different points in time. As such, an input force may exceed a low force threshold as well as a high force threshold, while an input object may eventually release the application of the input force accordingly. Thus, a processing system may determine at what time and/or the location in the sensing region does the input force falls below the high force threshold.

In one or more embodiments, a performance force threshold is used in place of the high force threshold in Step 650. The performance threshold may be a force threshold that corresponds to a force value lower than the high force threshold in order to account for hysteresis. In one or more embodiments, the performance force threshold designates a value of an input force that occurs when an input object releases completely from an input surface.

In Step 655, an interface action is performed for a high input force in accordance with one or more embodiments. Using the determination that the force information from Step 630 corresponds to a high input force, one or more interface actions may be selected by a processing system to be performed. Thus, in one or more embodiments, a type of interface action is performed based on when and/or the location of the input object where the input force falls below the high force threshold. In one or more embodiments, the selection of the interface action for the high input force is also based on a gesture motion determined by FIG. 7 and the accompanying description below.

In one or more embodiments, the low force threshold and the high force threshold described above with respect to FIG. 6 above, is used to implement a multi-level tactile switch. For example, the low force threshold and high force threshold determinations in Steps 610 and 630 may be used to produce a keyboard assembly where a high force produces one user input while a low force produces a different user input.

In one or more embodiments, multiple input objects are used with respect to FIG. 6 above. For example, where the input objects are fingers, one finger may produce a low input force, while a different finger may produce a high input force. Thus, interface actions may be selected in Steps 633 and 655 using various combinations of low input forces and high input forces. In other embodiments, different interface actions are selected according to the number of input objects present on the input surface when at least one of the input objects produces a high input force. In one or more embodiments, for example, a first type of user interface action menu is provided when two input objects present on an input surface exceed a high input force, and a second type of user interface action menu is provided when three input objects present on the input surface exceed a high input force. Additionally, the high input force threshold may be modified based on the number of input objects on the input surface. For example, two input objects may have a lower high force threshold than the high force threshold for three input objects. Similarly, when multiple input objects are present on the input surface, the force applied by each input object may be considered separately and compared to an individual input object high force threshold different from a total force high force threshold. In one or more embodiments, the total force threshold is an aggregate amount of force measured for separate input objects present on the input surface.

Figure 7:
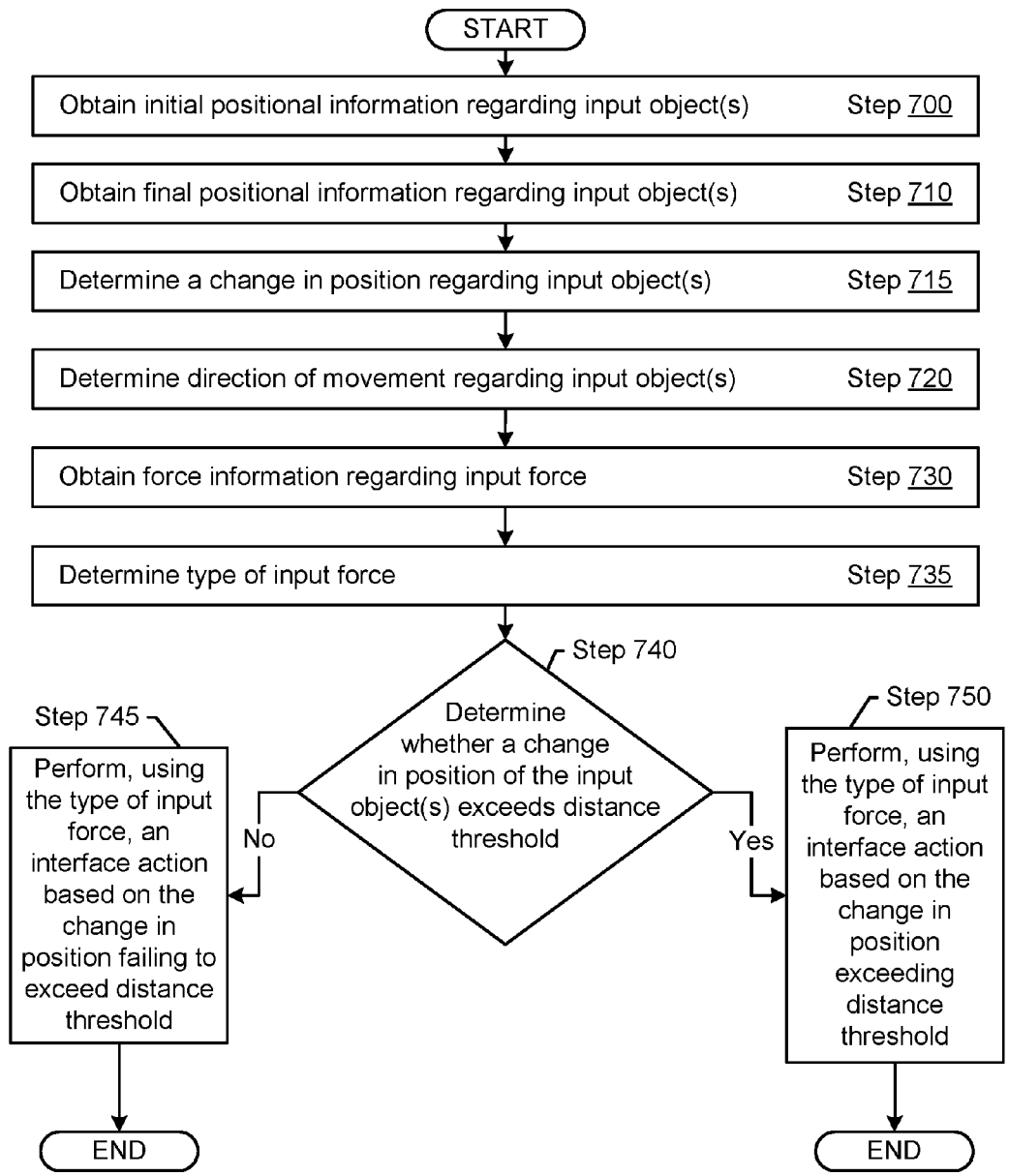

Turning to FIG. 7, FIG. 7 shows a flowchart in accordance with one or more embodiments. The process shown in FIG. 7 may involve, for example, one or more components discussed above in reference to FIG. 1 (e.g., processing system (110)). While the various steps in FIG. 7 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 700, initial positional information is obtained regarding one or more input objects in accordance with one or more embodiments. In one or more embodiments, a processing system records positional information regarding the position of an input object in a sensing region at regular intervals, e.g., for each sensing interval when a new capacitive image of the sensing region is acquired by the input device. In one or more embodiments, the initial positional information corresponds to the position of the input object when an input force exceeds a low force threshold or a high force threshold.

In Step 710, final positional information is obtained regarding one or more input objects in accordance with one or more embodiments. In one or more embodiments, the final positional information corresponds to the position of the input object when an input force falls below a particular force threshold. For example, a processing system may obtain final positional information regarding the position of the input object when an applied input force drops below a high force threshold. In one or more embodiments, the final positional information from Step 700 is determined independent of when an input force falls below a particular force threshold.

In Step 715, a change in position regarding one or more input objects is determined in accordance with one or more embodiments. Specifically, the change in position may be determined by the difference between the initial positional information from Step 700 and the final positional information from Step 710. In one or more embodiments, the change in position corresponds to a gesture distance measured after an input force falls below a high force threshold.

In Step 720, direction of movement regarding one or more input objects is determined in accordance with one or more embodiments. In one or more embodiments, using the change in position determined in Step 715, the direction of movement of the input object is determined. For example, a processing system may determine which cardinal direction or directions (e.g., northwest, southeast) is an input object moving.

In Step 730, force information is obtained regarding an input force in accordance with one or more embodiments. Force information may be obtained similar to Step 600 as described in FIG. 6.

In Step 735, a type of input force is determined in accordance with one or more embodiments. In one or more embodiments, Step 735 corresponds to one or more steps from FIG. 6. In particular, one or more steps from FIG. 6 may be used to determine whether the force information from Step 630 describes an input force below a low force threshold, between a low force threshold and a high force threshold, or above the high force threshold.

In Step 740, a determination is made whether a change in position of one or more input objects exceeds a distance threshold in accordance with one or more embodiments. Specifically, the change in position determined in Step 715 may be compared to a distance threshold. For example, a processing system may determine whether an input object produces a gesture distance that exceeds the distance threshold. In one or more embodiments, gesture distance A (331) and gesture distance B (332) in FIGS. 3A-3B described above are examples illustrating the change in position of an input object.

In one or more embodiments, multiple distance thresholds are used. For example, a processing system may determine that the change in position from Step 715 is greater than distance threshold A, but less than distance threshold B. In one or more embodiments, an interface action may be selected according to which distance thresholds are exceed by the change in position.

When it is determined that the change in position fails to exceed the distance threshold, the process may proceed to Step 745. When it is determined that the change in position exceeds the distance threshold, the process may proceed to Step 750.

In Step 745, an interface action is performed using a type of input force and based on the change in position failing to exceed the distance threshold in accordance with one or more embodiments. For example, if the input force exceeds a high force threshold, but fails to exceed the distance threshold, one type or group of interface actions may be selected. On the other hand, if the input force exceeds only the low force threshold, another type or group of interface actions may be selected. Accordingly, a processing system may perform the interface action within a graphical user interface. In one or more embodiments, the interface action is selected based on the change of position determined in Step 715 and/or the direction of movement determined in Step 720. In other words, a gesture motion in the sensing region north may cause one type of interface action to be performed, while a gesture motion in the opposite direction may cause a different type of interface action to be performed. Conversely, if the gesture motion occurs before or after an input force falls below a high force threshold, different interface actions may be performed accordingly.

In one or more embodiments, a previous of an interface action is generated within the graphical user interface in Step 745. In particular, failing to exceed the distance threshold may produce the previous, while exceeding the distance threshold may cause the performance of the interface action. As such, the previous may be shown in a GUI window within the graphical user interface.

In Step 750, an interface action is performed using a type of input force and based on the change in position exceeding the distance threshold in accordance with one or more embodiments. In one or more embodiments, where a previous of an interface action or an interface action menu is displayed in a graphical user interface, a gesture motion with a change in position exceeding the distance threshold removed the preview or interface action menu.

Figure 8A:
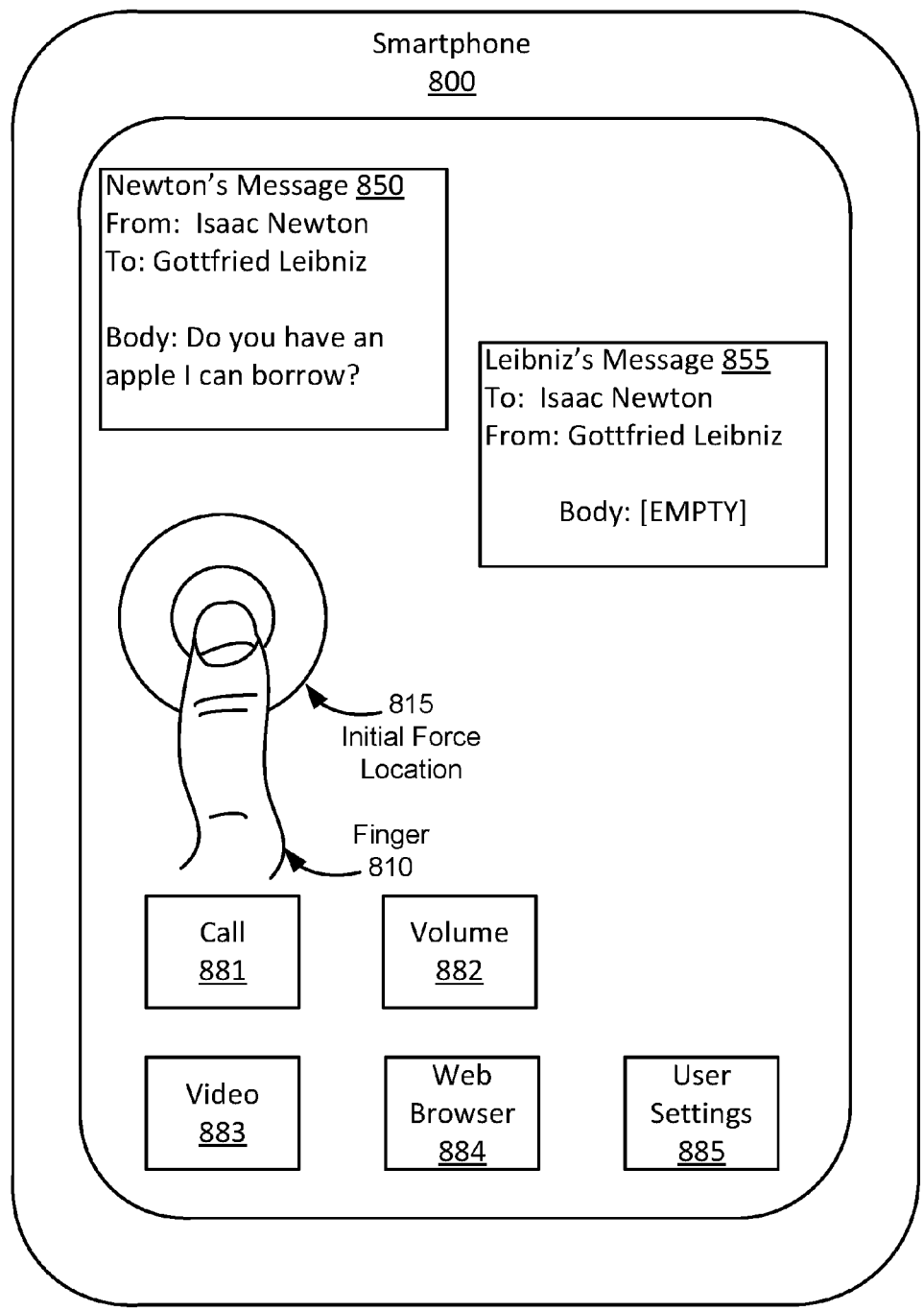
FIGS. 8A, 8B, and 8C show an example in accordance with one or more embodiments.
Figure 8B:
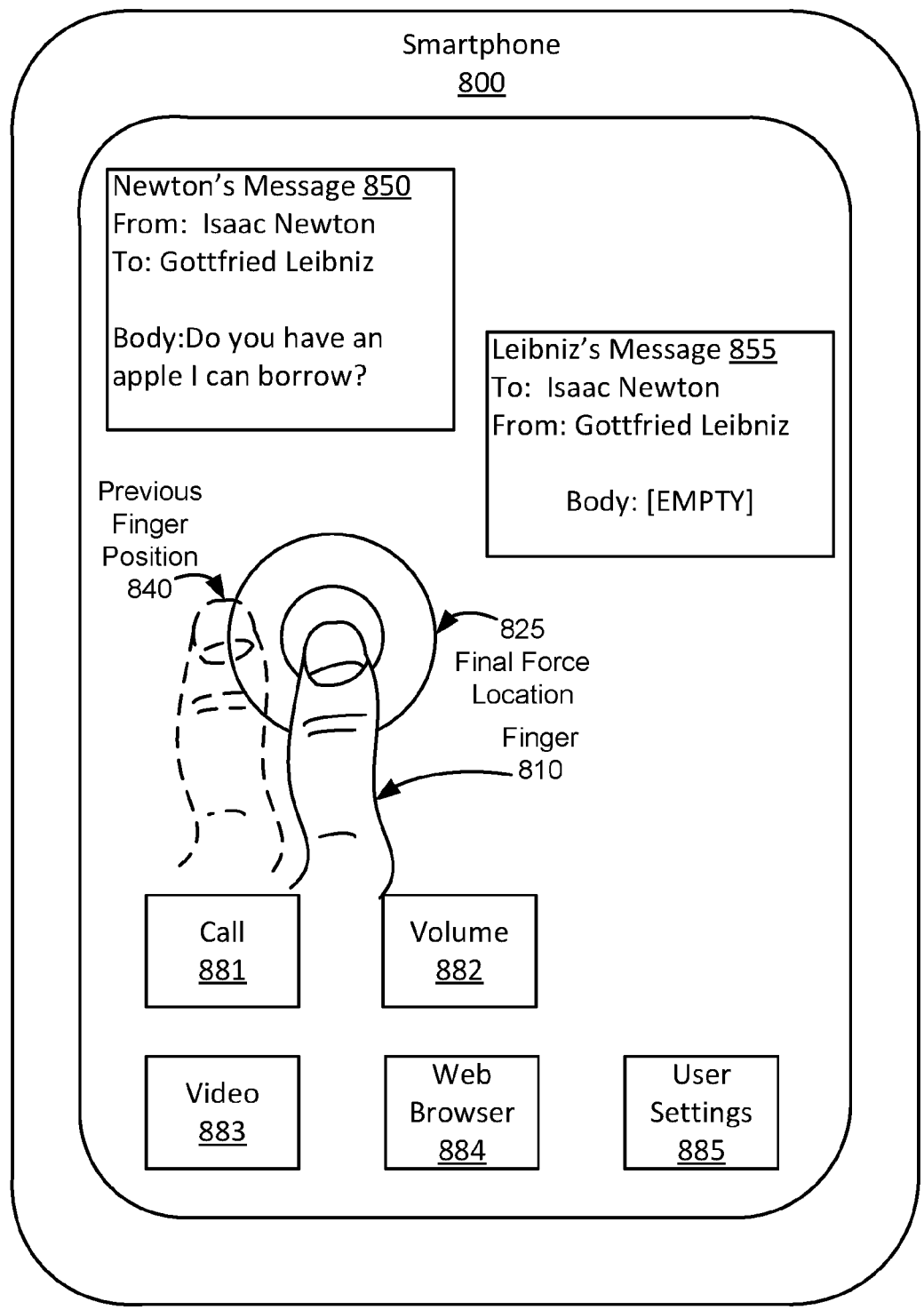
Figure 8C:
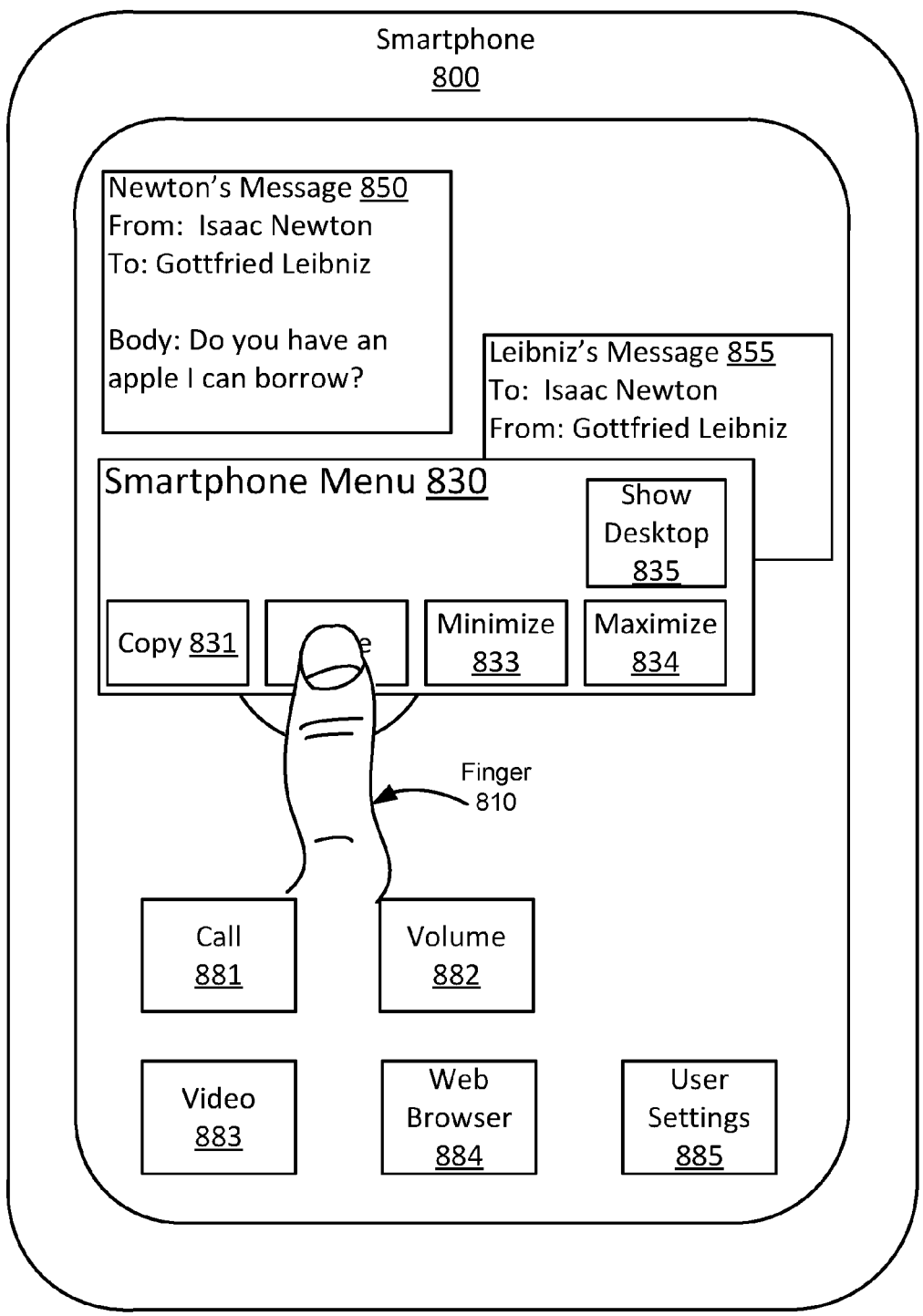
Figure 9:
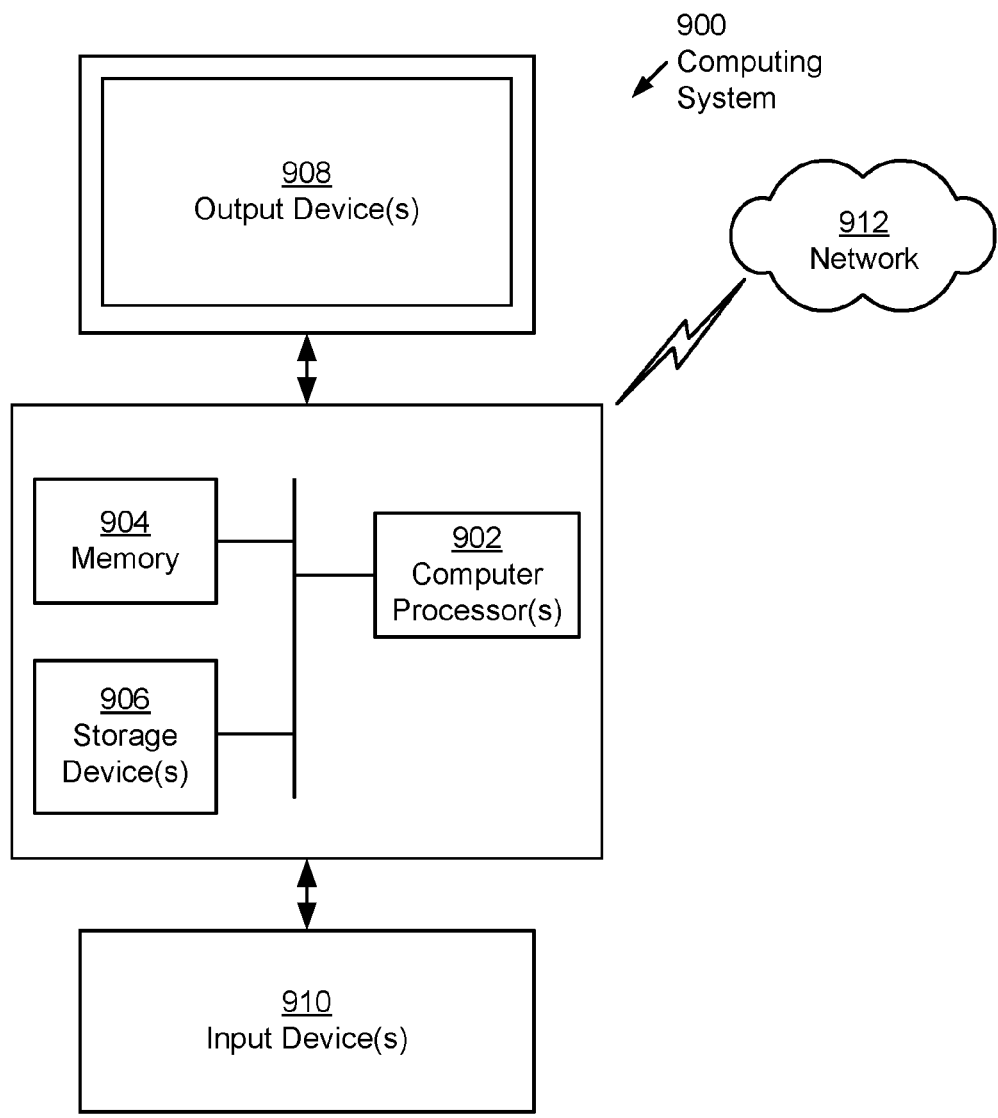
FIG. 9 shows a computer system in accordance with one or more embodiments.

FIGS. 8A, 8B, and 8C provide an example of generating an interface action with a press hard and gesture motion. The following example is for explanatory purposes only and not intended to limit the scope of the invention.

Turning to FIG. 8A, a graphical user interface is shown on a smartphone (800). Specifically, the graphical user interface includes several interface action icons (e.g., Call (881), Volume (882), Video (883), Web Browser (884), User Settings (885)) as well as a couple of GUI windows with various messages (i.e., Newton's Message (850), Leibniz's Message (855)). As shown in FIG. 8A, a finger (810) is pressing on the screen of the smartphone (800) to apply an input force at an initial force location (815).

Turning to FIG. 8B, the finger (810) maintains an input force applied to the screen of the smartphone (800), while the finger (810) also slides along the screen to a final force location (825). Thus, the finger (810) produces a gesture motion between the previous finger position (840) and a final finger position as shown in FIG. 8B.

Turning to FIG. 8C, a processing system (not shown) in the smartphone (800) selects an interface action according the input force applied by the finger (810) as well as the gesture motion of the finger (810) illustrated in FIGS. 8A and 8B. Accordingly, the processing system selects an interface action that produces a smartphone menu (830) at the tip of the finger (810). As shown, the smartphone menu (830) lists other interface actions now available for quick access (e.g., copy (831), minimize (833), maximize (834), and show desktop (835)) to a user.

Embodiments may be implemented on a computing system. Any combination of mobile, desktop, server, embedded, or other types of hardware may be used. For example, as shown in FIG. 5, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (900) may be located at a remote location and connected to the other elements over a network (912). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A method, comprising:
obtaining force information regarding an input force applied by at least one input object to a sensing region of an input device;
determining, using the force information, whether the input force exceeds a force threshold;
obtaining positional information for the at least one input object in the sensing region of the input device;
determining, using the positional information, that a first change in position of the at least one input object is less than a distance threshold when the input force exceeds the force threshold; and
performing an interface action within a graphical user interface in response to determining that the input force decreases below the force threshold.

2. The method of claim 1, further comprising:
determining, using the positional information, that a second change in position occurs after the input force decreases below the force threshold and the second change in position is less than the distance threshold,
wherein performing the interface action comprises selecting the interface action from a plurality of interface actions in response to determining that the second change in position is less than the distance threshold.

3. The method of claim 1, further comprising:
generating a preview of the interface action within the graphical user interface in response to determining that the first change in position of the at least one input object fails to exceed the distance threshold.

4. The method of claim 1,
wherein the positional information describes a direction of movement by the at least one input object within the sensing region, and
wherein the interface action is selected from a plurality of interface actions based on a direction of movement of the at least one input object from a position of the at least one input object in the sensing region and that is determined when the input force of the at least one input object exceeds the force threshold.

5. The method of claim 1, wherein the positional information comprises an initial position of the at least one input object in the sensing region determined when the input force applied by the at least one input object exceeds the force threshold and a final position of the at least one input object in the sensing region determined when the input force applied by the at least one input object decreases below the force threshold.

6. The method of claim 1, further comprising:
generating a haptic response in response to the input force exceeding the force threshold,
wherein the haptic response is generated by the input device.

7. The method of claim 1, wherein, in response to determining that the input force exceeds the force threshold, performing the interface action comprises displaying an interface action menu within the graphical user interface.

8. A processing system for an input device, the processing system comprising:
sensor circuitry communicatively coupled to a plurality of sensor electrodes of the input device;
wherein the processing system is configured to:
determine force information regarding an input force applied by at least one input object to an input surface;
determine, using the force information, whether the input force exceeds a force threshold;
determine, using the plurality of sensor electrodes, positional information for the at least one input object in the sensing region;
determine, using the positional information, that a first change in position of the at least one input object is less than a distance threshold when the input force exceeds the second force threshold; and
perform an interface action within a graphical user interface in response to determining that the input force decreases below at least the second force threshold.

9. The processing system of claim 8, further configured to:
determine, using the positional information, that a second change in position, occurring after the input force decreases below at least the second force threshold, is less than the distance threshold,
wherein performing the interface action comprises selecting the interface action in response to determining the second change in position is less than the distance threshold.

10. The processing system of claim 8, further configured to:
generate a preview of the interface action within the graphical user interface in response to determining that the first change in position of the at least one input object fails to exceed the distance threshold.

11. The processing system of claim 8,
wherein the positional information describes a direction of movement by the at least one input object within the sensing region, and
wherein the interface action is selected from a plurality of interface actions based on a direction of movement of the at least one input object from a position of the at least one input object in the sensing region and that is determined when the input force of the at least one input object exceeds at least the second force threshold.

12. The processing system of claim 8, wherein the positional information comprises an initial position of the at least one input object in the sensing region determined when the input force applied by the at least one input object exceeds the second threshold and a final position of the at least one input object in the sensing region determined when the input force applied by the at least one input object decreases below at least the second force threshold.

13. The processing system of claim 8, further configured to:
display an interface action menu within the graphical user interface in response to determining that the input force exceeds the second force threshold.

14. An electronic system, comprising:
a display device configured to display a graphical user interface;
an input device comprising a plurality of sensor electrodes and an input surface having a sensing region; and
a processing system communicatively coupled to the display device and the input device, the processing system configured to:
determine force information regarding an input force applied by at least one input object to the input surface;

determine, using the force information, whether the input force exceeds a force threshold;

determine positional information for the at least one input object in the sensing region;

determine, using the positional information, that a first change in position of the at least one input object is less than a distance threshold when the input force exceeds the force threshold; and perform an interface action within the graphical user interface in response to determining that the input force decreases below the force threshold.

15. The electronic system of claim 14, wherein the display device and the input device are disposed in a portable computing device, and wherein the input device comprises a touchpad separate from the display device in the portable computing device.

16. The electronic system of claim 14, wherein the display device and the input device are disposed in a handheld computing device, and wherein the input device is integrated with a screen in the display device.

17. The electronic system of claim 14, wherein the processing system is further configured to:

determine, using the positional information, that a second change in position, occurring after the input force decreases below the force threshold, is less than the distance threshold, wherein performing the interface action comprises selecting, in response to determining the second change in position is less than the distance threshold, the interface action.

18. The electronic system of claim 14, wherein the processing system is further configured to:

generate a preview of the interface action within the graphical user interface in response to determining that the first change in position of the at least one input object fails to exceed the distance threshold.

19. The electronic system of claim 14, wherein the positional information describes a direction of movement by the at least one input object in the sensing region, and wherein the interface action is selected from a plurality of interface actions based on a direction of movement of the at least one input object from a location of the at least one input object in the sensing region determined when the input force of the at least one input object exceeds the force threshold.

20. The electronic system of claim 14, wherein the positional information comprises an initial position of the at least one input object in the sensing region determined when the input force applied by the at least one input object exceeds the force threshold and a final position of the at least one input object in the sensing region that is determined when the input force applied by the at least one input object decreases below the force threshold.

\* \* \* \* \*